(12) United States Patent
Mager et al.

(10) Patent No.: US 6,652,976 B2
(45) Date of Patent: Nov. 25, 2003

(54) CONDUCTIVE, HIGHLY ABRASION-RESISTANT COATINGS, A PROCESS FOR THEIR PRODUCTION AND THEIR USE

(75) Inventors: Michael Mager, Leverkusen (DE); Klaus Wussow, Netphen (DE); Udo Guntermann, Krefeld (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/898,346

(22) Filed: Jul. 3, 2001

(65) Prior Publication Data

US 2002/0114960 A1 Aug. 22, 2002

(30) Foreign Application Priority Data

Jul. 5, 2000 (DE) .......................................... 100 32 631

(51) Int. Cl.⁷ ................................................ B32B 9/04
(52) U.S. Cl. ...................... 428/447; 427/299; 427/387; 427/372.2; 524/261; 524/266; 524/368; 524/588; 524/609; 525/100; 525/101
(58) Field of Search ...................... 428/447; 427/299, 427/387, 372.2; 524/261, 266, 368, 588, 609; 525/100, 101

(56) References Cited

U.S. PATENT DOCUMENTS

| | | | |
|---|---|---|---|
| 4,959,430 A | 9/1990 | Jonas et al. ................. | 526/257 |
| 4,987,042 A | 1/1991 | Jonas et al. ................. | 429/213 |
| 5,035,926 A | 7/1991 | Jonas et al. ............... | 427/393.1 |
| 5,300,575 A | 4/1994 | Jonas et al. ................. | 525/186 |
| 5,681,885 A | 10/1997 | Kinoshita et al. ........... | 524/430 |
| 5,742,119 A | 4/1998 | Aben et al. ................. | 313/479 |
| 5,773,150 A | 6/1998 | Tong et al. ................. | 428/429 |
| 6,201,051 B1 | 3/2001 | Mager et al. ............... | 524/261 |
| 6,235,827 B1 | 5/2001 | Kim et al. ................... | 524/403 |

FOREIGN PATENT DOCUMENTS

| | | |
|---|---|---|
| DE | 42 11 459 | 10/1993 |
| DE | 42 29 192 | 3/1994 |
| EP | 96/05606 | * 2/1996 |
| WO | WO 98/25274 | * 6/1998 |

OTHER PUBLICATIONS

Methoden Der Organischen Chemie (Houben–Weyl) vol. E 20, Makromolukulare Staffe, Part 2 pp. 1441–1443 (month unavailable) 1987, R. Dhein, K. Reuter u. G. Ruf: Alkydharze.

* cited by examiner

Primary Examiner—Robert Dawson
Assistant Examiner—Christopher M. Keehan
(74) Attorney, Agent, or Firm—Joseph C. Gil; Gary F. Matz

(57) ABSTRACT

Conductive, highly abrasion-resistant coatings on mouldings, consisting of at least one conductive layer and at least one highly abrasion-resistant layer, a process for their production and their use.

14 Claims, No Drawings

CONDUCTIVE, HIGHLY ABRASION-RESISTANT COATINGS, A PROCESS FOR THEIR PRODUCTION AND THEIR USE

BACKGROUND

The invention relates to conductive, highly abrasion-resistant coatings on mouldings, including at least one conductive layer and at least one highly abrasion-resistant layer and a process for their production and their use.

Conductive coatings based on polyethylene dioxythiophene (PEDT) already have a broad area of application, e.g, anti-static finishes for photographic films. Numerous processes have described how such conductive coatings can be produced. Basically, either the PEDT, which is mixed with a binder, is applied or a multi-layered structure is chosen which has the advantage that binder and PEDT do not have to be compatible (miscible).

Conductive and scratch-resistant multi-layered structures for coating picture tubes are described in WO 96/05606. Scratch-resistant layers, for example silicon dioxide obtained by hydrolysis and condensation of tetraethyl orthosilicate, are applied to a conductive PEDT layer, the layer thickness being limited to 50 to 250 nm. Alternatively, production of scratch-resistant layers from inorganic-organic hybrid materials is described, which layers can be applied to the conductive layer in a layer thickness of 10 $\mu$m and greater. These hybrid materials are based on trialkoxysilanes of Formula R'—Si(OR)$_3$, wherein R' represents a polymerisable group. The multi-layered structures described in WO 96/05606 have several fundamental disadvantages however:

After applying one of the described scratch-resistant layers, a notable level of conductivity can no longer be measured on the surface of the multi-layered structure.

Although a good level of scratch resistance is found (ascertained by determining the lead pencil hardness), the abrasion resistance of the coatings is poor.

High curing temperatures, 160° C. in the examples.

Antistatic multi-layered structures, in which the top (scratch-resistant) layer must also exhibit a certain level of conductivity, or multi-layered structures with vitreous abrasion resistance cannot therefore be produced. Furthermore, curing temperatures of 160° C. cannot be used for coating the majority of plastics materials (softening).

Conductive coatings for transparent substrates, such as plastics materials or glass for example, must retain their optical properties undiminished under mechanical load and must therefore have high resistance to abrasion. In WO 98/25274, mixtures are described which produce conductive coatings with good adhesion and with improved scratch resistance and transmittance of visible light. These mixtures consist of a binder based on polyfunctional organosil(ox) anes and a conductive organic polymer which are known from WO 98/25274 and EP-A 0 947 520. The described binders are wherein they contain heterometals such as boron or aluminium and exhibit particularly good abrasion resistance.

In EP-A 0 947 520 it is stated that these binders react sensitively to the addition of water, so by adding PEDT for example, in the conventional form supplied (Baytron® P, approximately 1.3% dispersion of PEDT and polystyrene sulphonate in water), the processing time of these mixtures is significantly reduced. Furthermore, the addition of PEDT to the binder often leads to a loss in abrasion resistance which can clearly be seen even with highly abrasion resistant coatings.

The object of the present invention was therefore to provide conductive surfaces provided with abrasion-resistant coatings, during the production of which the above-mentioned disadvantages are avoided.

Surprisingly it has now been found that a multi-layered structure on a substrate (moulding) including at least one conductive layer and at least one highly abrasion-resistant layer still has a measurable level of electrical conductivity on the surface of a moulding even though the top, highly abrasion resistant layer is a good electrical insulator.

SUMMARY

The invention relates to a conductive and highly abrasion-resistant coating. The coating comprises (a) a first layer comprising an electrically conductive polymer, and (b) a second layer comprising a highly abrasion-resistant layer of a polyfunctional organosil(ox)ane, wherein the coating is on a substrate of a multi-layer structure. The invention also relates to a method for making and using such a coating. These and other features, aspects, and advantages of the present invention will become better understood with reference to the following description and appended claims.

DESCRIPTION

The present invention therefore relates to conductive and highly abrasion-resistant coatings on a substrate as a result of a multi-layered structure, wherein an electrically conductive polymer is applied in a first layer and a highly abrasion-resistant layer of polyfunctional organosil(ox)anes is applied in a second layer.

The mouldings coated according to the invention have a measurable level of electrical conductivity on the surface even though the highly abrasion-resistant layer is a good insulator. The abrasion resistance of the multi-layered structure according to the invention (in the Taber abraser test) is similar to that of glass and curing can advantageously take place at temperatures lower than 160° C.

The present invention also relates to a process for producing conductive and highly abrasion-resistant coatings, wherein a conductive layer is applied wet chemically in a first stage and a highly abrasion-resistant layer is subsequently applied in a second stage.

Highly abrasion-resistant coatings in the context of the invention are those which exhibit scattered light on the scratch mark (determined in accordance with ASTM D 1003) in the Taber abraser scratch test (determined according to ASTM D 1044, 1,000 cycles, 500 g load per wheel, CS-10-F stones) of less than 20%, preferably less than 10%, particularly preferably less than 5%. In comparison, commercially available Makrolon®, for example, exhibits scattered light of more than 30% on the scratch mark even after 100 cycles in the Taber abraser test. Glass exhibits scattered light of approximately 1 to 3% after 1,000 cycles in the Taber abraser test.

Polyfunctional organosil(ox)anes in the context of the invention are linear, branched or cyclic monomeric organosil(ox)anes which have at least two silicon atoms with hydrolysable and/or condensation crosslinking groups, wherein the silicon atoms are connected to one another in each case by means of a linking constructional unit with at least one carbon atom. Examples of polyfunctional organosil (ox)anes are found inter alia in EP-A 0 947 520. Production of aluminium- and boron-containing sol-gel condensates from which coatings with particularly high abrasion resistance can be obtained is also described therein.

Sol-gel materials based on cyclic carbosiloxanes of Formula (I)

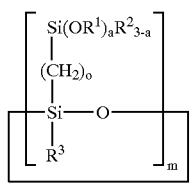

in which
m is 3 to 6, and preferably m is 3 or 4,
o is 2 to 10, and preferably o is 2 and
a is 1 to 3, $R^1$ is $C_1$–$C_6$-alkyl, $C_6$–$C_{14}$-aryl, preferably $R^1$ is methyl, ethyl, isopropyl and when a is 1 $R^1$ can also represent hydrogen, furthermore when
$R^2$ is $C_1$–$C_6$-alkyl, $C_6$–$C_{14}$-aryl, preferably $R^2$ is methyl and
$R^3$ is $C_1$–$C_6$-alkyl, $C_6$–$C_{14}$-aryl, preferably $R^3$ is methyl, ethyl and particularly preferably $R^3$ is methyl, are used to produce highly abrasion-resistant coatings which, in addition to their high mechanical strength, also exhibit good weathering resistance.

As described in WO 98/52992 and in U.S. Pat. No. 6,005,131, the cyclic carbosiloxanes are co-condensed with tetraalkoxysilanes, organotrialkoxysilanes and/or nanoparticles, the presence of aluminium or boron alkoxides enhancing the abrasion resistance of the coatings produced from the condensates as shown in EP-A 0 947 520.

Conductive coatings in the context of the invention exhibit a surface resistance of 0.1 to $10^{12}$ Ω/□.

Preparations of polythiophenes as they are described in DE-OS 42 11 459, EP-A 339 340 and EP-A 440 957 are preferably used as conductive layers. They contain polythiophene salts of the polythiophene$^{m+}$ An$^{m-}$(= polyanion) type, wherein the polythiophene cation polythiophene$^{m+}$ contains positively charged units of Formula (II).

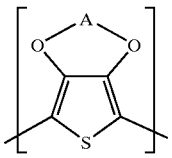

wherein
A represents a $C_1$–$C_4$-alkylene radical optionally substituted by $C_1$–$C_{20}$-alkyl-, —$CH_2$—OH or $C_6$–$C_{14}$-aryl groups. The number of units in the polythiophene cation can be between 5 and 100.

Examples of polyanions which can be used according to the invention are the anions of polymeric carboxylic acids such as polyacrylic acids, polymethacrylic acids, polymaleic acids, furthermore anions of polymeric sulphonic acids such as polystyrene sulphonic acids and polyvinyl sulphonic acids. These polycarbonic acids and polysulphonic acids can also be copolymers of vinyl carboxylic acids and vinyl sulphonic acids with other polymerisable monomers such as acrylic acid esters and styrene.

The mean molecular weight $M_w$ of the polymeric acids, from which the polyanions which can be used according to the invention are derived, is 1,000 to 2,000,000, preferably 2,000 to 500,000. The polymeric acids or their alkali metal salts are commercially available or can be produced by known processes as described, for example, in Houben-Weyl: "Methoden der organischen Chemie", Volume E20, "Makromolekulare Stoffe", Part 2, p. 1141 et seq.

With the multi-layered structure produced according to the invention, a distinction has to be made between the conductivity of the PEDT-containing layer as such and the conductivity of the top, highly abrasion-resistant coating. As the latter is an electrical insulator, the conductivity of the entire layer structure is obviously lower than that of the PEDT layer(s) beneath it.

The simplest layer structure produced according to the invention consists of the substrate, a PEDT-containing layer and a highly abrasion-resistant top layer.

In an embodiment of the present invention, conductive and abrasion-resistant surfaces on mouldings are obtained in that a PEDT-containing layer is initially applied to the substrate and highly volatile constituents such as solvents are optionally evaporated. The highly abrasion-resistant coating is then applied with or without further curing and is finally cured by heat or irradiation.

In a further embodiment of the present invention, the surface of the substrate is treated chemically with an adhesion promoter, or physically (plasma, corona), prior to application of the conductive layer, in order to achieve improved adhesion. This is particularly important with plastics materials but may also be necessary, for example, with glass. It is, however, also possible to add the adhesion promoter to the PEDT-containing solution, whereby an additional coating stage can be avoided.

It is also possible to finally provide the multi-layered structure produced by wet chemistry according to the invention with an inorganic layer, for example, of $SiO_2$, $TiO_2$ or $Al_2O_3$ precipitated from the gaseous phase. As a result, the wear resistance or the anti-reflective effect can be further improved.

The conductive and highly abrasion-resistant layer can be applied by any commonly known technique, such as centrifuging, spraying, dipping, casting, knife coating or brushing.

Examples of substrates which can be provided with the multi-layered structure according to the invention include metals, ceramics, wood, glass and plastics materials such as polycarbonate.

The surfaces produced according to the invention and provided with a conductive and highly abrasion-resistant coating are used, e.g., as low radiation screens (electrical resistance of the PEDT layer less than 1,000 Ω/□) or as antistatic and abrasion-resistant plastics materials, for example, in the form of films, extruded parts or injection mouldings. Polycarbonate, in particular, can be protected in this way from mechanical damage and electrostatic charges.

The invention is further described in the following illustrative examples in all percentages are based on weight and on the total quantity of all components used.

EXAMPLES

A mixture consisting of 42.92% Baytron® P, 2.58% N-methyl-2-pyrolidone, 0.86% Silquest® A 187 and 53.64% isopropanol was used to produce the conductive layer ("CPP 105"). Baytron® P (Bayer AG, Leverkusen) is an approximately 1.3% dispersion of polyethylene dioxythiophene and polystyrene sulphonate in water.

Production of the Scratch-Resistant Coating I From Sol-Gel Solution I

The scratch-resistant coating I was produced from the sol-gel solution I consisting of 6.8% cyclo-$\{SiOCH_3[(CH_2)_2Si(CH_3)_2OH]\}_4$, 32.1% tetraethyl orthosilicate, 9.6% aluminium-2-butylate, 5.1% acetoacetic ester, 12.6% 0.1 N aqueous toluene-p-sulphonic acid solution, 32.8% 1-methoxy-2-propanol and 1% Tinuvin® 384. Production is described in EP-A 0 947 520.

Cyclo-$\{SiOCH_3[(CH_2)_2Si(CH_3)_2OH]\}_4$ was produced as described in U.S. Pat. No. 5,880,305.

Production of the scratch-resistant coating II from sol-gel solution II

The scratch-resistant coating II was produced from the sol-gel solution II which was produced as follows: initially, a mixture of 12.7% cyclo-$\{SiOCH_3[(CH_2)_2Si(CH_3)(OEt)_2]\}_4$-oligomer, 26.6% tetraethyl orthosilicate and 33.3% 1-methoxy-2-propanol was hydrolysed with 7.0% 0.1 N aqueous toluene-p-sulphonic acid solution while stirring. After a reaction time of 120 min., complex aluminium tributylate was added at 5° C. (produced by mixing 7.9% aluminium tri-sec-butylate in 2.6% 1-methoxy-2-propanol with 4.2% acetoacetic ester at 0° C. while stirring) and after stirring for a further 5 min. a further 4.8% 0.1 N aqueous toluene-p-sulphonic acid solution, 0.1% Tegoglide® 410 and 0.9% Tinuvin® 384 were added. After being heated to ambient temperature, the reaction mixture was finally stirred for a further 90 min. and was then ready for processing. Cyclo-$\{SiOCH_3[(CH_2)_2Si(CH_3)(OEt)_2]\}_4$-oligomer was produced as described in WO 98/52992.

The various layers were applied by centrifuging the maximum speed (in rpm) and the dwell time at maximum speed are always given (in s) in each case.

The lead pencil hardness was determined to ASTM 3363, the wear resistance was tested by the Taber abraser test (ASTM D 1044; 1,000 cycles, 500 g per wheel, CS-10-F stone) and subsequent determining of the scattered light (ASTM D 1003).

The surface resistance was determined with a commercially available measuring instrument (ITT, MX52S type) and conductive silver strips arranged in a square (length of the strips=spacing between the strips).

Example 1

Coating of Glass with Scratch-Resistant Coating I

The mixture CPP 105 was initially applied to six 7.5×7.5 cm sheets of glass by centrifuging and was cured for 1 hour at 130° C. The process was repeated for a double coating. A 2 mm wide strip of conductive silver was then applied over the entire length to two opposing sides and was cured for 30 minutes at 160° C. After cooling, the electrical resistance was measured.

The above-described sol-gel mixture I was then also applied by centrifuging (500 rpm, 20 s). The mixture was cured for 1 hour at 130° C. After cooling, both the surface resistance of the overall layer structure and the electrical resistance of the conductive layer as such were determined. The abrasion resistance was ascertained by determining the lead pencil hardness.

The exact application conditions during centrifuging, the electrical resistances measured and the results of the lead pencil hardness tests are summarised in Table 1.

TABLE 1

| Sample No. | Application conditions conductive layer CPP 105 | Surface resistance [kΩ/□] CPP 105 | Scratch-resistant coating I | Lead pencil hardness |
|---|---|---|---|---|
| 1 | 400 rpm, 20 s | 2.8 | 133 | >9 H |
| 2 | 2 × 400 rpm, 20 s | 1.3 | 270 | 7 H |
| 3 | 600 rpm, 20 s | 3.6 | not determined | >9 H |
| 4 | 2 × 600 rpm, 20 s | 1.8 | 48 | >9 H |
| 5 | 1,000 rpm, 20 s | 120 | not determined | >9 H |
| 6 | 2 × 1,000 rpm, 20 s | 7.0 | 53 | >9 H |

Example 2

Coating of Makrolon® with Scratch-Resistant Coating I (with Intermediate Curing of the Conductive Layer)

A 10×10 cm sheet of Makrolon® was initially coated with 3-amino-propyltrimethoxysilane by centrifuging (2,000 rpm, 20 s) and heat treated for 1 hour at 80° C. in order to improve adhesion. The PEDT-containing mixture CPP 105 was then applied (1,000 rpm, 20 s) and subsequently cured for 1 hour at 130° C. Finally, after cooling to ambient temperature, the scratch-resistant coating I was applied (500 rpm, 20 s) and was then cured for 1 hour at 80° C. and for 1 hour at 130° C.

Measurement of the electrical resistances gave 1.4×10$^4$ Ω/□ for the conductive layer and 10$^8$ Ω/□ on the surface of the scratch-resistant coating I.

Example 3

Coating of Makrolon® with Scratch-Resistant Coating I (Without Intermediate Curing of the Conductive Layer)

Six 10×10 cm sheets of Makrolon® were initially coated with 3-aminopyltrimethoxysilane by centrifuging (2,000 rpm, 20 s) and heat treated for 1 hour at 80° C. to improve adhesion. The PEDT-containing mixture CPP 105 was the applied and after evaporation for 10 min at ambient temperature the scratch-resistant coating I was applied and was subsequently cured for 1 hour at 80° C. and for 1 hour at 130° C. The application conditions were varied for the PEDT-containing layer and the scratch-resistant paint I and are summarised in Table 2. The results of the Taber abraser test after determining the scattered light are also listed there.

TABLE 2

| Sample No. | Application conditions CPP 105 | Application conditions Scratch-resistant paint I | Scattered light[*)] | Surface resistance [Ω/□] |
|---|---|---|---|---|
| 7 | 2,000 rpm, 20 s | 400 rpm, 20 s | 4.8 (0.7) | 8.0 × 10$^8$ |
| 8 | 2,000 rpm, 20 s | 500 rpm, 20 s | 4.8 (0.8) | 6.0 × 10$^8$ |
| 9 | 1,000 rpm, 20 s | 400 rpm, 20 s | 4.7 (0.7) | 2.0 × 10$^9$ |
| 10 | 1,000 rpm, 20 s | 500 rpm, 20 s | 5.3 (0.6) | 1.3 × 10$^9$ |

TABLE 2-continued

| Sample No. | Application conditions CPP 105 | Application conditions Scratch-resistant paint I | Scattered light[*) ] | Surface resistance [Ω/□] |
|---|---|---|---|---|
| 11 | 500 rpm, 20 s | 400 rpm, 20 s | 4.4 (0.8) | $1.6 \times 10^9$ |
| 12 | 500 rpm, 20 s | 500 rpm, 20 s | 4.6 (0.7) | $1.0 \times 10^9$ |

[*)] Scattered light from the scratch-resistant coating in Taber abraser test (starting values in brackets)

Example 4

Coating of Glass with Scratch-Resistant Coating II

Initially, the mixture CPP 105 was applied to four 10×10 cm sheets of glass by centrifuging and was cured for 1 hour at 130° C. The process was repeated for double or treble coatings. Subsequently, the surface resistance of the coating applied in this way was determined.

The above-described sol-gel mixture II was subsequently applied by centrifuging (500 rpm, 20 s). The mixture was cured for 1 hour at 130° C. After cooling, the lead pencil hardness and the optical transmittance of the multi-layered structure obtained was determined. The results are summarised in Table 3.

TABLE 3

| Sample No. | Application conditions conductive layer CPP 105 scratch-resistant layer II | Surface resistance [Ω/□] CPP 105 | Lead pencil hardness | Transmittance between 400 and 700 nm |
|---|---|---|---|---|
| 1 | 500 rpm, 20 s 800 rpm, 20 s | 5100 | >7 H | >84% |
| 2 | 500 rpm, 20 s 400 rpm, 20 s | 5100 | >7 H | >86% |
| 3 | 2 × 500 rpm, 20 s 400 rpm, 20 s | 1900 | >7 H | >68% |
| 4 | 3 × 500 rpm, 20 s 400 rpm, 20 s | 900 | >7 H | >51% |

Comparison Example 1

A mixture of 10 mol % phenyltrimethoxysilane, 65 mol % 3-glycidoxypropyltrimethoxylsilane, 5 mol % 3-aminopropyltriethoxysilane and 20 mol % aluminium tributylate was produced as described in WO 96/05606. In addition, 40 g aluminium tributylate were dissolved in 48 g isopropanol and reacted with 21 g acetoacetic ester. This mixture was then added to a mixture of 16 g phenyltrimethoxysilane, 120 g 3-glycidoxypropyltrimethoxysilane and 9 g 3-aminopropyltriethoxysilane. The mixture was subsequently diluted with 100 g isopropanol and 100 g diacetone alcohol and water was added while cooling with ice. After the additions had been made, the reaction mixture was finally stirred for a further 2 hours at ambient temperature. A 10×10 cm sheet of Makrolon® was initially coated with 3-aminopropyltrimethoxysilane by centrifuging (2,000 rpm, 20 s) and heat treated for 1 hour at 80° C. to improve adhesion. The above-described reaction mixture was then applied, also by centrifuging (300 rpm, 20 s), and heat treated for 1 hour at 130° C.

A very low abrasion resistance was found in the Taber abraser test (1,000 cycles). The scratch mark exhibited scattered light of more than 38%.

What is claimed is:

1. A conductive and highly abrasion-resistant coating comprising:

(a) a first layer comprising an electrically conductive polymer, and (b) a second layer comprising a highly abrasion-resistant layer of a polyfunctional organosiloxane comprising cyclic carbosiloxanes, wherein the coating is on a substrate of a multi-layer structure.

2. The coating of claim 1, wherein the substrate is a moulding and the coating further comprises polyethylene dioxythiophene.

3. The coating of claim 1, wherein the highly abrasion-resistant layer is produced from cyclic carbosiloxanes.

4. The coating of claim 1, wherein the coating exhibits less than 20% scattered light on the scratch mark in the Taber abraser scratch test.

5. The coating of claim 1, wherein the coating exhibits less than 10% scattered light on the scratch mark.

6. The coating of claim 1, wherein the coating exhibits less than 5% scattered light on the scratch mark.

7. The coating of claim 1, wherein the coating exhibits a surface resistance of 0.1 to $10^{12}$ Ω/9.

8. A process for making a conductive and highly abrasion-resistant coating comprising a conductive and highly abrasion-resistant coating comprising (1) a first layer comprising an electrically conductive polymer, and (2) a second layer comprising an applied highly abrasion-resistant layer of polyfunctional organosiloxanes comprising cyclic carbosiloxanes, wherein the coating is on a substrate of a multilayer structure, and wherein the process comprises:

(a) applying the first layer in a first stage on the substrate, and (b) subsequently applying the second layer in a second stage.

9. The process of claim 8, wherein a polyethylene dioxythiophene-containing layer is applied to the substrate in the first stage and highly volatile constituents comprising solvents, are optionally evaporated.

10. The process of claim 8, wherein the highly abrasion-resistant coating is applied in the second stage and is cured by heat or irradiation.

11. The process of claim 8, wherein thermal curing takes place at temperatures lower than 160° C.

12. The process of claim 8, wherein prior to the first stage, the surface of the substrate is chemically or physically treated.

13. The coating of claim 1, wherein the coating is a coating of a low radiation screen or an antistatic plastic material.

14. The coating of claim 1, wherein the coating is a coating of a film, an extruded part or an injection moulding.

* * * * *